US011933482B1

(12) United States Patent
He

(10) Patent No.: US 11,933,482 B1
(45) Date of Patent: Mar. 19, 2024

(54) CEILING FAN LIGHT WIRING STRUCTURE

(71) Applicant: Guangdong Lac Smart Lighting Co., Ltd, Dongguan (CN)

(72) Inventor: Xiaoming He, Dongguan (CN)

(73) Assignee: GUANGDONG LAC SMART LIGHTING CO., LTD, Dongguan (CN)

( * ) Notice: Subject to any disclaimer, the term of this patent is extended or adjusted under 35 U.S.C. 154(b) by 0 days.

(21) Appl. No.: 18/320,165

(22) Filed: May 18, 2023

(30) Foreign Application Priority Data

Apr. 13, 2023 (CN) ........................ 202320818492.X

(51) Int. Cl.
*F21V 23/00* (2015.01)
*F04D 19/00* (2006.01)
*F21V 33/00* (2006.01)
*F21Y 115/10* (2016.01)

(52) U.S. Cl.
CPC .......... *F21V 23/001* (2013.01); *F04D 19/002* (2013.01); *F21V 33/0096* (2013.01); *F21Y 2115/10* (2016.08)

(58) Field of Classification Search
CPC .. F21V 23/001; F21V 33/0096; F04D 19/002; F21Y 2115/10
See application file for complete search history.

(56) References Cited

U.S. PATENT DOCUMENTS

2018/0058476 A1* 3/2018 Jones .................... F04D 29/601

* cited by examiner

*Primary Examiner* — Brandon D Lee
(74) *Attorney, Agent, or Firm* — Andrew C. Cheng

(57) ABSTRACT

A ceiling fan light wiring structure includes a positioning plate with wiring terminals fixed thereon, one end of the wiring terminals is connected to a line passing through a fixing rod, a top of the fixing rod is fixed to a bottom of the positioning plate so that the fixing rod hangs below the positioning plate. A bottom of the fixing rod is connected with a rotation assembly. Blades are connected to a bottom of the rotation assembly, and are equiangularly arranged about the fixing rod. An upper shielding plate is disposed at the top of the fixing rod, the upper shielding plate has a hollow interior and has a height greater than that of the positioning plate. Connection of the line and the motor wiring is achieved through quick plugs, which facilitates the user installing the ceiling fan light by herself or himself and subsequent wiring connection.

7 Claims, 4 Drawing Sheets

CEILING FAN LIGHT WIRING STRUCTURE

FIELD OF THE INVENTION

The present invention relates generally to the technical field of ceiling fan lights and, more particularly, to a simple installation (wiring) structure for a ceiling fan light.

DESCRIPTION OF THE RELATED ART

A ceiling fan light is a device that combines a ceiling fan and a light. The ceiling fan light can not only illuminate, but it also can generate wind through the rotation of the ceiling fan, which not only increases the aesthetics but also increases the practicality of the ceiling fan light, and thus has become many people's favorite furniture for home decoration.

As a light unit is additionally included in the existing ceiling fan light, the number of wires inside the ceiling fan light is increased. When a customer buying the ceiling fan light installs the ceiling fan light by herself or himself, the excessive wires may lead to wiring errors and maintenance troubles. Therefore, installation and maintenance of the ceiling fan lights by non-skilled persons may cause safety risks, and it is also inconvenient for non-skilled persons to assemble and disassemble the ceiling fan lights.

Therefore, a simple installation (wiring) structure for the ceiling fan light is proposed which can satisfactorily address the above problems.

SUMMARY OF THE INVENTION

The objective of the present invention is to provide a simple installation (wiring) structure for a ceiling fan light which can solve the above-mentioned problems that it is inconvenient for installation and wiring and difficult for maintenance.

In order to attain the above objective, the present invention provides a ceiling fan light wiring structure, including a positioning plate, the positioning plate configured to be mounted on a ceiling. Wiring terminals are fixed on a side of the positioning plate, one end of the wiring terminals is connected to a line that passes through a center of a fixing rod, a top of the fixing rod is fixed to a bottom of the positioning plate by a bolt so that the fixing rod hangs below the positioning plate. A bottom of the fixing rod is connected with a rotation assembly, and blades are connected to a bottom of the rotation assembly by screws, the number of the blades is three, and the three blades are equiangularly arranged about the fixing rod.

Preferably, an upper shielding plate is disposed at the top of the fixing rod, the upper shielding plate has a hollow interior and has a height greater than that of the positioning plate.

With the above structure, the upper shielding plate can shield the positioning plate, thus improving the aesthetics of the ceiling fan light.

Preferably, marks are made on the line, and a bottom of the line is connected to a wiring harness of the light body, and the light body is disposed below the blades.

The above structure facilitates the wiring connection, avoiding incorrect connection when connecting the wiring and making maintenance easier.

Preferably, the light body comprises a combination of an LED light and an RGB light, with the LED light disposed at a bottom of the light body, and the RGB light disposed at a top of the light body.

The above structure provides a diversity of the light body, thus enriching the types of the light source and effectively enhancing the user experience.

Preferably, the top of the light body is connected with a pull rope, a top of the pull rope is connected to a hook, a top of the hook is connected in a convex pin, and a top of the convex pin is fixed to the bottom of the rotation assembly.

With the above structure, falling off of the light body can be prevented so that the pull rope can provide improved protection to the light body.

As compared with the prior art, the present invention has the following beneficial effects. The ceiling fan light wiring structure facilitates wiring and improves safety. With the line connected to the motor wiring, subsequent installation is facilitated. The pull rope can avoid the falling of the light body, thus improving the protection. These beneficial effects are described in more detail below.

(1) The line and the motor wiring are provided; installation can be done simply by connecting the line and the motor wiring, which facilitates the user installing the ceiling fan light by herself or himself and subsequent wiring connection;

(2) The pull rope is provided; the light body is held by the pull rope, which avoids falling off of the light body, so that the falling height of the light body can be limited by the pull rope, thereby improving the safety of use.

BRIEF DESCRIPTION OF THE DRAWINGS

The present invention will be further described below in conjunction with the accompanying drawings and embodiments, in which.

REFERENCE NUMERALS

Figure 1:
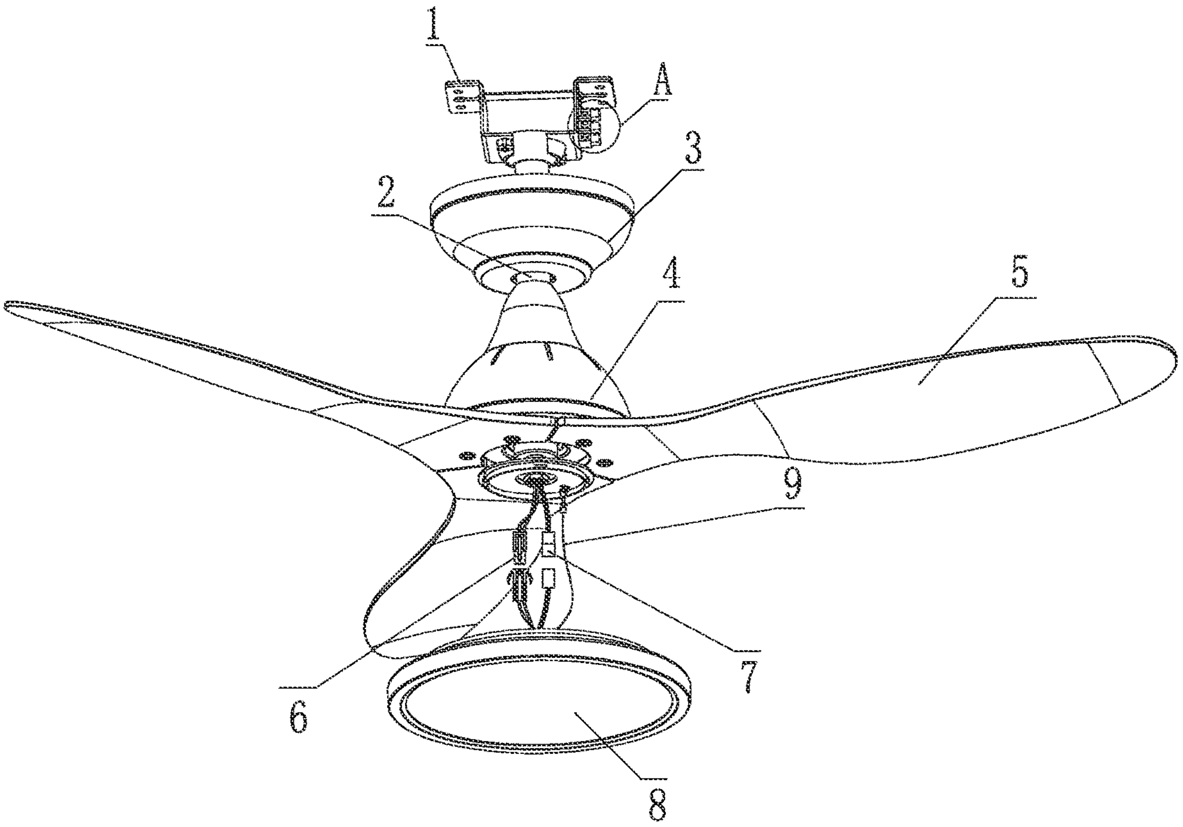
FIG. 1 is a perspective view of a ceiling fan light of the present invention.

1, Positioning plate; 101, Wiring terminal, 2, Fixing rod; 3, Upper shielding plate, 4, Rotation assembly; 5, Blade; 6, Line; 7, Motor wiring; 8, light body; 9, Pull rope; 10, Hook; 11, Convex pin.

DETAILED DESCRIPTION OF EMBODIMENTS

In order to have a better understanding of the technical features, objectives and results of the present invention, the specific embodiments of the present invention will now be described in detail with reference to the accompanying drawings.

Referring to FIGS. 1-4, the present invention provides a ceiling fan light wiring structure, including a positioning plate 1 for being mounted on a wall, such as, a ceiling. Wiring terminals 101 are fixedly mounted on a side of the positioning plate 1, and are connected with a line 6 that passes through a center of a fixing rod 2. A top of the fixing rod 2 is fixedly mounted to a bottom of the positioning plate 1 by bolts, so that the fixing rod 2 hangs below the positioning plate 1. A bottom of the fixing rod 2 is connected with a rotation assembly 4, and blades 5 are connected to a bottom of the rotation assembly 4 by screws. The number of the blades 5 is three, and the three blades 5 are equiangularly arranged about the fixing rod 2. An upper shielding plate 3 is disposed at the top of the fixing rod 2. The upper shielding plate 3 has a hollow interior and has a height greater than that of the positioning plate 1.

Figure 2:
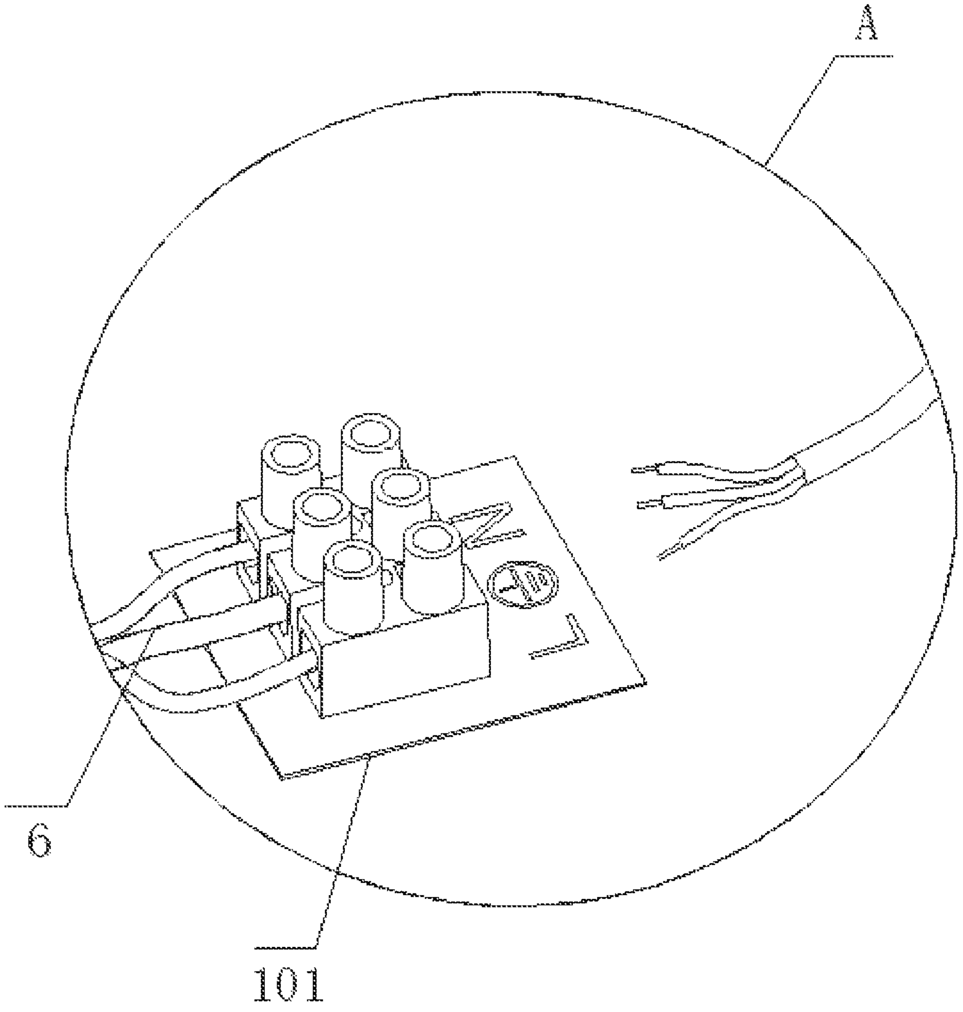
FIG. 2 is an enlarged view of portion A of the ceiling fan light of FIG. 1.
Figure 3:
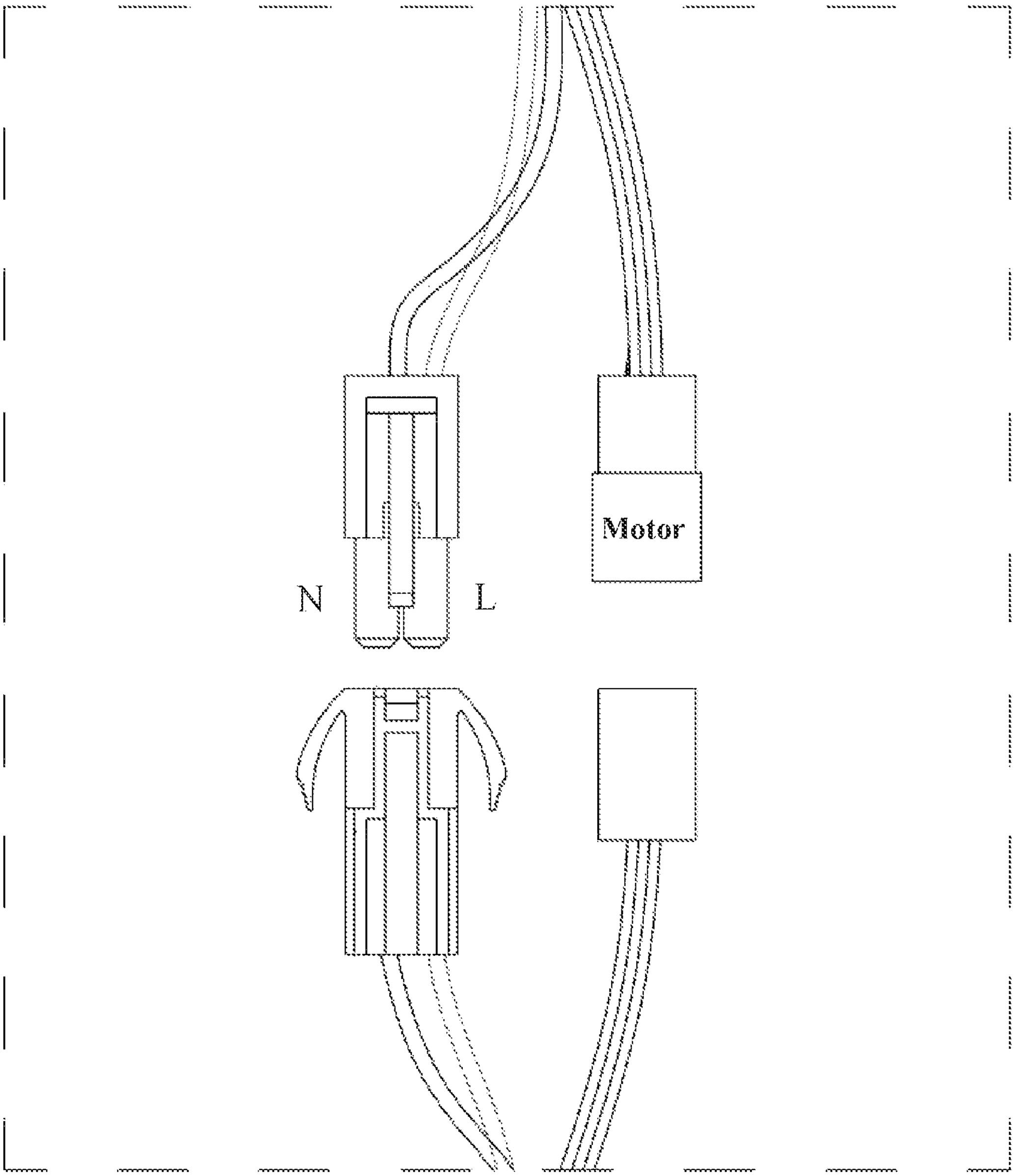
FIG. 3 illustrates a line of the ceiling fan light of FIG. 1.

Referring to FIGS. 1 to 3, during installation, the positioning plate 1 is fixed on the wall, the line 6 is connected to the wiring terminals 101 by using a screwdriver, a light body 8 is connected to the line 6, and a motor wiring 7 is connected, which enables the user to carry out convenient and quick installation. Power is supplied to the light body 8 via the line 6, which is in turn supplied to a motor of the rotation assembly 4 via the motor wiring 7, which drives the rotation assembly 4 to turn the blades 5. The upper shielding plate 3 can shield the positioning plate 1, thus increasing the aesthetics of the ceiling fan light. The blades 5 can be driven to rotate by the rotation assembly 4. Therefore, installation errors will not occur when the customer installs the ceiling fan light by herself or himself, thus reducing the safety risks. In the illustrated embodiment, the wiring structure is provided with a line (AC input) quick plug and a motor wiring quick plug. Connection of the line 6 and the motor wiring 7 is achieved through the quick plugs, which facilitates the user installing the ceiling fan light by herself or himself and subsequent wiring connection.

Marks are made on the line 6, and a bottom of the line 6 is connected to a wiring harness of the light body 8, and the light body 8 is disposed below the blades 5. The light body 8 includes a combination of LED light and RGB light, with the LED light disposed at a bottom of the light body 8 and the RGB light disposed at a top of the light body 8. The light body 8 further includes a driver disposed between the LED light and the RGB light. The light body 8 is connected to the motor wiring 7 through the wiring harness. The top of the light body 8 is connected with a pull rope 9, a top of the pull rope 9 is connected to a hook 10, a top of the hook 10 is connected in a convex pin 11, and a top of the convex pin 11 is fixed to the bottom of the rotation assembly 4.

Figure 4:
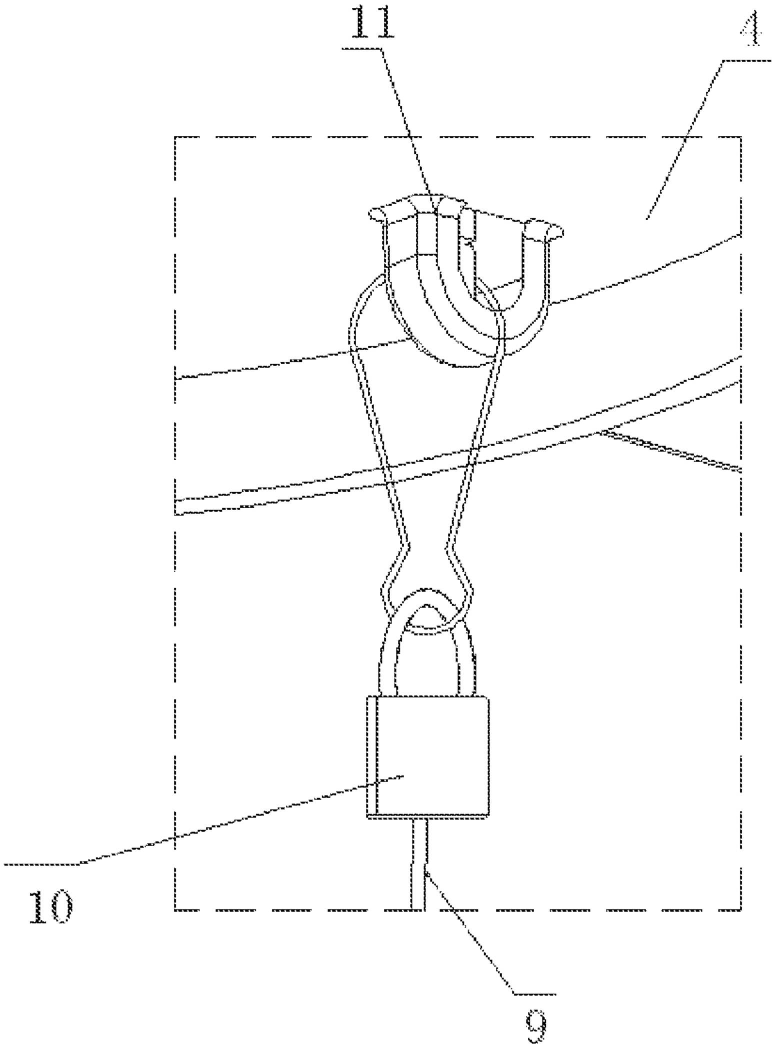
FIG. 4 illustrates a protruding pin of the ceiling fan light of FIG. 1.

Referring to FIG. 1 and FIG. 4, the hook 10 is connected inside the convex pin 11, so the hook 10 can hold the pull rope 9 which in turn holds the light body 8, so that the falling height of the light body 8 can be limited by the pull rope 9 in case the light body 8 falls, thereby preventing the light body 8 from falling to hurt people and thus improving the safety of use. The ceiling fan light can provide lighting to the house through the light body 8. The light body 8 can be replaced only after the hook 10 is disconnected from the convex pin 11, thus providing convenience.

In use of the ceiling fan light wiring structure, first referring to FIG. 1 to FIG. 3, during installation, the positioning plate 1 is fixed on the wall, and the motor wiring 7 is connected, which enables the user to carry out convenient and quick installation. The upper shielding plate 3 can shield the positioning plate 1, thus increasing the aesthetics of the ceiling fan light. The blades 5 can be driven to rotate by the rotation assembly 4. Therefore, installation errors will not occur when the customer installs the ceiling fan light by herself or himself, thus reducing the safety risks.

Referring to FIG. 1 and FIG. 4, the hook 10 is connected inside the convex pin 11, so that the falling height of the light body 8 can be limited by the pull rope 9 in case the light body 8 falls. The ceiling fan light can provide lighting to the house through the light body 8, and the light body 8 can be replaced only after the hook 10 is disconnected from the convex pin 11, thus providing convenience.

The above are only embodiments of the present invention and do not limit the scope of the present invention. Any equivalent structure or equivalent process transformations made based on the content of the description and drawings of the present invention, or direct or indirect application in other related technical fields, fall equally within the patent scope of the present invention.

What is claimed is:

1. A ceiling fan light wiring structure, comprising a positioning plate (1), the positioning plate (1) configured to be mounted on a wall, wherein, wiring terminals (101) are fixed on a side of the positioning plate (1), one end of the wiring terminals (101) is connected to a line (6) that passes through a center of a fixing rod (2), a top of the fixing rod (2) is fixed to a bottom of the positioning plate (1) by a bolt so that the fixing rod (2) hangs below the positioning plate (1);

a bottom of the fixing rod (2) is connected with a rotation assembly (4), and blades (5) are connected to a bottom of the rotation assembly (4) by screws, the number of the blades (5) is three, and the three blades (5) are equiangularly arranged about the fixing rod (2); and a light body disposed below the blades (5) and electrically connected with the line (6).

2. A ceiling fan light wiring structure according to claim 1, wherein an upper shielding plate (3) is disposed at the top of the fixing rod (2), the upper shielding plate (3) has a hollow interior and has a height greater than that of the positioning plate (1).

3. A ceiling fan light wiring structure according to claim 1, wherein marks are made on the line (6), and a bottom of the line (6) is connected to a wiring harness of the light body (8).

4. A ceiling fan light wiring structure according to claim 3, wherein the light body (8) comprises an LED light, an RGB light and a driver, with the LED light disposed at a bottom of the light body (8), the RGB light disposed at a top of the light body (8), and the driver disposed between the LED light and the RGB light.

5. A ceiling fan light wiring structure according to claim 3, wherein the light body (8) is connected to a motor wiring (7) through the wiring harness of the light body (8).

6. A ceiling fan light wiring structure according to claim 5, wherein the top of the light body (8) is connected with a pull rope (9), a top of the pull rope (9) is connected to a hook (10), a top of the hook (10) is connected in a convex pin (11), and a top of the convex pin (11) is fixed to the bottom of the rotation assembly (4).

7. A ceiling fan light wiring structure according to claim 1, wherein the top of the light body (8) is connected with a pull rope (9), a top of the pull rope (9) is connected to a hook (10), a top of the hook (10) is connected in a convex pin (11), and a top of the convex pin (11) is fixed to the bottom of the rotation assembly (4).

* * * * *